(12) United States Patent
Klotz et al.

(10) Patent No.: US 9,800,133 B2
(45) Date of Patent: Oct. 24, 2017

(54) ACTIVE COMMON MODE CANCELLATION

(71) Applicant: Infineon Technologies AG, Neubiberg (DE)

(72) Inventors: Frank Klotz, Munich (DE); Stephan Cordes, Augsburg (DE)

(73) Assignee: Infineon Technologies AG, Neubiberg (DE)

( * ) Notice: Subject to any disclaimer, the term of this patent is extended or adjusted under 35 U.S.C. 154(b) by 0 days.

(21) Appl. No.: 15/077,617

(22) Filed: Mar. 22, 2016

(65) Prior Publication Data

US 2017/0279345 A1   Sep. 28, 2017

(51) Int. Cl.
*H02M 1/12*   (2006.01)
*H02M 1/44*   (2007.01)
*H02P 29/00*   (2016.01)

(52) U.S. Cl.
CPC ............... *H02M 1/12* (2013.01); *H02M 1/44* (2013.01); *H02P 29/0038* (2013.01); *H02M 2001/123* (2013.01)

(58) Field of Classification Search
CPC .... H02M 1/12; H02M 1/44; H02M 2001/123; H02P 29/0038; H01L 2924/181; H01L 2924/00012; H01L 2224/0603; H01L 2224/48139; H01L 2224/4903; H01L 23/08; H01L 23/367; H01L 23/3736; H01L 23/49506; H01L 23/4952; H01L 23/49524; H01L 23/49568; H01L 23/49575; H01L 23/49589
USPC ....... 318/400.24, 400.25; 327/308, 310, 315, 327/317, 318; 363/39, 40, 34, 37; 375/346; 330/149, 258
See application file for complete search history.

(56) References Cited

U.S. PATENT DOCUMENTS

| | | | | | |
|---|---|---|---|---|---|
| 3,705,365 A | * | 12/1972 | Szabo | ..... | G08C 15/08 330/149 |
| 4,580,112 A | * | 4/1986 | Winslow | ..... | H04B 3/28 307/90 |
| 4,679,130 A | * | 7/1987 | Moscovici | ..... | G05F 1/563 323/266 |
| 4,725,938 A | * | 2/1988 | Onodera | ..... | H02M 3/135 363/28 |
| 4,876,637 A | * | 10/1989 | Mose | ..... | H02M 5/4505 318/802 |
| 4,937,720 A | * | 6/1990 | Kirchberg | ..... | H02M 5/272 363/35 |
| 5,373,223 A | * | 12/1994 | Akagi | ..... | H02M 5/4585 318/438 |

(Continued)

OTHER PUBLICATIONS

Neugebauer et al., "Parasitic Capacitance Cancellation in Filter Inductors," IEEE Transactions on Power Electronics, vol. 21, No. 1, Jan. 2007, pp. 282-288.

(Continued)

*Primary Examiner* — Rita Leykin
(74) *Attorney, Agent, or Firm* — Shumaker & Sieffert, P.A.

(57) ABSTRACT

In some examples, a circuit is configured to generate a first signal based at least in part on an input signal, wherein the first signal comprises a common mode signal and a load signal. The circuit is further configured to generate a second signal based at least in part on the input signal, wherein the second signal comprises an inverted version of the common mode signal. The circuit is further configured to apply the first signal and the second signal to a load.

20 Claims, 12 Drawing Sheets

(56) References Cited

U.S. PATENT DOCUMENTS

| | | | | |
|---|---|---|---|---|
| 5,483,140 A * | 1/1996 | Hess | H02M 5/4505 | 318/722 |
| 5,568,371 A * | 10/1996 | Pitel | H02J 3/01 | 361/113 |
| 5,661,390 A * | 8/1997 | Lipo | H02M 1/12 | 318/492 |
| 5,831,842 A * | 11/1998 | Ogasawara | H02M 1/12 | 363/34 |
| 6,134,126 A * | 10/2000 | Ikekame | H02J 3/01 | 307/105 |
| 6,208,537 B1 * | 3/2001 | Skibinski | H02M 1/12 | 363/40 |
| 6,377,479 B1 * | 4/2002 | Ayano | H02M 1/12 | 363/39 |
| 6,452,819 B1 * | 9/2002 | Wobben | H02M 1/126 | 363/132 |
| 6,636,107 B2 * | 10/2003 | Pelly | H02M 1/12 | 327/552 |
| 6,646,837 B2 * | 11/2003 | West | H02M 1/15 | 361/42 |
| 6,690,230 B2 * | 2/2004 | Pelly | H02M 1/12 | 327/100 |
| 6,775,157 B2 * | 8/2004 | Honda | H02M 1/12 | 363/39 |
| 6,781,444 B2 * | 8/2004 | Pelly | H02M 1/15 | 327/552 |
| 6,788,558 B2 * | 9/2004 | Pelly | H02M 1/126 | 323/209 |
| 6,794,929 B2 * | 9/2004 | Pelly | H02M 1/12 | 327/551 |
| 6,819,076 B2 * | 11/2004 | Takahashi | H02P 29/50 | 318/671 |
| 6,839,250 B2 * | 1/2005 | Takahashi | H02M 1/15 | 327/552 |
| 6,842,069 B2 * | 1/2005 | Takahashi | H02M 1/12 | 327/552 |
| 6,898,092 B2 * | 5/2005 | Briere | H02M 1/44 | 363/39 |
| 6,911,805 B2 * | 6/2005 | Salama | H02M 5/458 | 322/24 |
| 6,954,366 B2 * | 10/2005 | Lai | H02M 5/293 | 363/71 |
| 6,985,341 B2 * | 1/2006 | Vinciarelli | H02M 1/32 | 361/58 |
| 7,050,311 B2 * | 5/2006 | Lai | H02M 5/225 | 363/37 |
| 7,084,604 B2 * | 8/2006 | Salomaki | H02P 21/13 | 318/767 |
| 7,187,229 B2 * | 3/2007 | Pelly | H02M 1/12 | 327/551 |
| 7,215,559 B2 * | 5/2007 | Nondahl | H02M 5/458 | 327/551 |
| 7,256,662 B2 * | 8/2007 | Wasaki | H04B 3/28 | 333/12 |
| 7,315,592 B2 | 1/2008 | Tsatsanis et al. | | |
| 7,385,438 B2 * | 6/2008 | Pelly | H02M 1/12 | 327/532 |
| 7,423,520 B2 * | 9/2008 | Wasaki | H03H 7/09 | 340/12.32 |
| 7,443,229 B1 * | 10/2008 | Vinciarelli | H02M 1/32 | 327/531 |
| 7,483,796 B2 * | 1/2009 | McLaughlin | G01R 31/006 | 702/58 |
| 7,532,491 B2 * | 5/2009 | Lim | H02M 1/4208 | 363/34 |
| 7,545,114 B2 * | 6/2009 | Baudesson | H02M 1/12 | 318/727 |
| 7,548,439 B2 * | 6/2009 | Meguro | H02M 1/12 | 363/132 |
| 7,583,136 B2 * | 9/2009 | Pelly | H02M 1/12 | 327/532 |
| 7,606,052 B2 * | 10/2009 | Akagi | H02M 1/12 | 363/40 |
| 7,881,081 B1 * | 2/2011 | Tallam | H02M 1/44 | 363/41 |
| 7,944,273 B1 * | 5/2011 | Vinciarelli | H02M 1/32 | 327/531 |
| 8,023,245 B2 * | 9/2011 | Feng | H02K 11/02 | 361/218 |
| 8,164,292 B2 * | 4/2012 | Park | H02P 23/26 | 318/400.26 |
| 8,169,179 B2 * | 5/2012 | Mohan | H02M 5/271 | 318/722 |
| 8,319,462 B2 * | 11/2012 | Inuduka | H02M 1/126 | 318/400.01 |
| 8,362,733 B2 * | 1/2013 | Inuduka | H02M 1/126 | 318/494 |
| 8,400,792 B2 * | 3/2013 | Sato | H02M 7/487 | 363/127 |
| 8,472,215 B2 * | 6/2013 | Koyama | H02M 1/126 | 363/131 |
| 8,514,596 B2 * | 8/2013 | Koyama | H02M 1/12 | 363/131 |
| 8,570,773 B2 * | 10/2013 | Skibinski | H02M 5/458 | 363/37 |
| 8,587,248 B2 * | 11/2013 | Hiller | H02M 7/483 | 318/722 |
| 8,649,193 B2 * | 2/2014 | Sakai | H02M 1/15 | 323/206 |
| 8,724,678 B2 * | 5/2014 | Farjadrad | H04L 12/10 | 375/219 |
| 8,755,205 B2 * | 6/2014 | Azuma | H02M 7/48 | 363/37 |
| 8,879,645 B2 * | 11/2014 | Okabe | H04B 1/1081 | 375/257 |
| 8,891,595 B1 * | 11/2014 | Farjadrad | H04L 12/10 | 375/219 |
| 8,970,148 B2 * | 3/2015 | Vrankovic | H02P 27/06 | 318/400.25 |
| 9,048,817 B2 * | 6/2015 | Shen | H03H 11/1217 | |
| 9,054,770 B2 * | 6/2015 | Okabe | H04B 1/1081 | |
| 9,130,542 B1 * | 9/2015 | Ishihara | H03H 11/126 | |
| 9,264,083 B2 * | 2/2016 | Okabe | H04B 1/1081 | |
| 9,621,094 B2 * | 4/2017 | Vrankovic | H02P 23/28 | |
| 9,653,919 B2 * | 5/2017 | Oswald | H02J 3/00 | |
| 2015/0280696 A1 | 10/2015 | Bernacchia et al. | | |

OTHER PUBLICATIONS

Ogasawara et al., "An Active Circuit for Cancellation of Common-Mode Voltage Generated by a PWM Inverter," IEEE Transactions on Power Electronics, vol. 13, No. 5, Sep. 1998, pp. 835-841.

"IGBT reverse conduction characteristics Hard-switching and soft-switching," Energy Saving Products BU, International Rectifier, Jul. 2013, 7 pp.

* cited by examiner

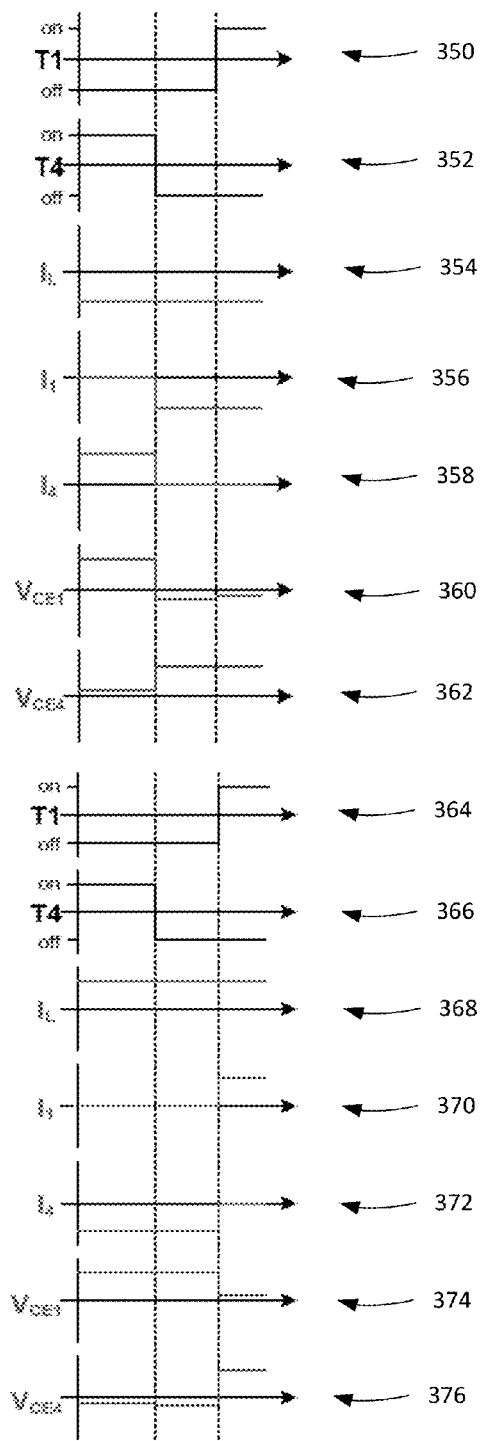
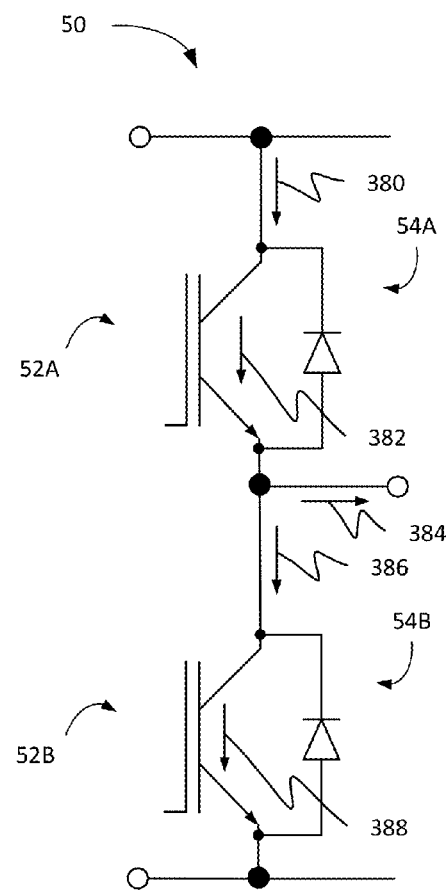
FIG. 9B
FIG. 9A

ACTIVE COMMON MODE CANCELLATION

TECHNICAL FIELD

This disclosure relates to electric circuits and, more particularly, to electric circuits for canceling common mode signals.

SUMMARY

This disclosure describes techniques for active cancellation of a common mode signal through the use of a cancellation signal that is an inverted version of the common mode signal. The common mode signal may exist as part of a first, primary signal that is applied to drive a load. The cancellation signal is added to the common mode signal, and the two signals cancel each other. The signals are added together by applying the cancellation signal and the common mode signal to the same load, which may result in the desired signal to drive the load.

In some examples, the disclosure describes a circuit configured to generate a first signal based at least in part on an input signal, wherein the first signal comprises a common mode signal and a load signal. The circuit is further configured to generate a second signal based at least in part on the input signal, wherein the second signal comprises an inverted version of the common mode signal. The circuit is further configured to apply the first signal and the second signal to a load.

In some examples, the disclosure describes a circuit configured to generate a cancellation signal based at least in part on an input signal and a common mode signal, wherein the cancellation signal comprises an inverted version of the common mode signal. The circuit is further configured to apply the cancellation signal to a load.

In some examples, the disclosure describes a system comprising an electric motor and a converter circuit configured to generate a first signal based at least in part on an input signal, wherein the first signal comprises a common mode signal and a load signal, wherein the converter circuit is configured to apply the first signal to the electric motor. The system further comprises a cancellation circuit configured to generate a second signal based at least in part on the input signal, wherein the second signal comprises an inverted version of the common mode signal, wherein the cancellation circuit is configured to apply the second signal to the electric motor via a cancellation capacitor.

In some examples, the disclosure describes a method comprising generating, by a first circuit, a first signal based at least in part on an input signal, wherein the first signal comprises a common mode signal and a load signal. The method further comprises generating, by a cancellation circuit, a second signal based at least in part on the input signal, wherein the second signal comprises an inverted version of the common mode signal. The method further comprises applying, by the first circuit, the first signal to a load. The method further comprises applying, by the cancellation circuit, the second signal to the load.

The details of one or more examples are set forth in the accompanying drawings and the description below. Other features, objects, and advantages will be apparent from the description and drawings, and from the claims.

BRIEF DESCRIPTION OF DRAWINGS

FIG. 9A includes graphs illustrating forced commutation versus natural commutation for two switches in accordance with some examples of this disclosure.

FIG. 9B is a circuit diagram illustrating forced commutation versus natural commutation for two switches in accordance with some examples of this disclosure.

DETAILED DESCRIPTION

Figure 1A:
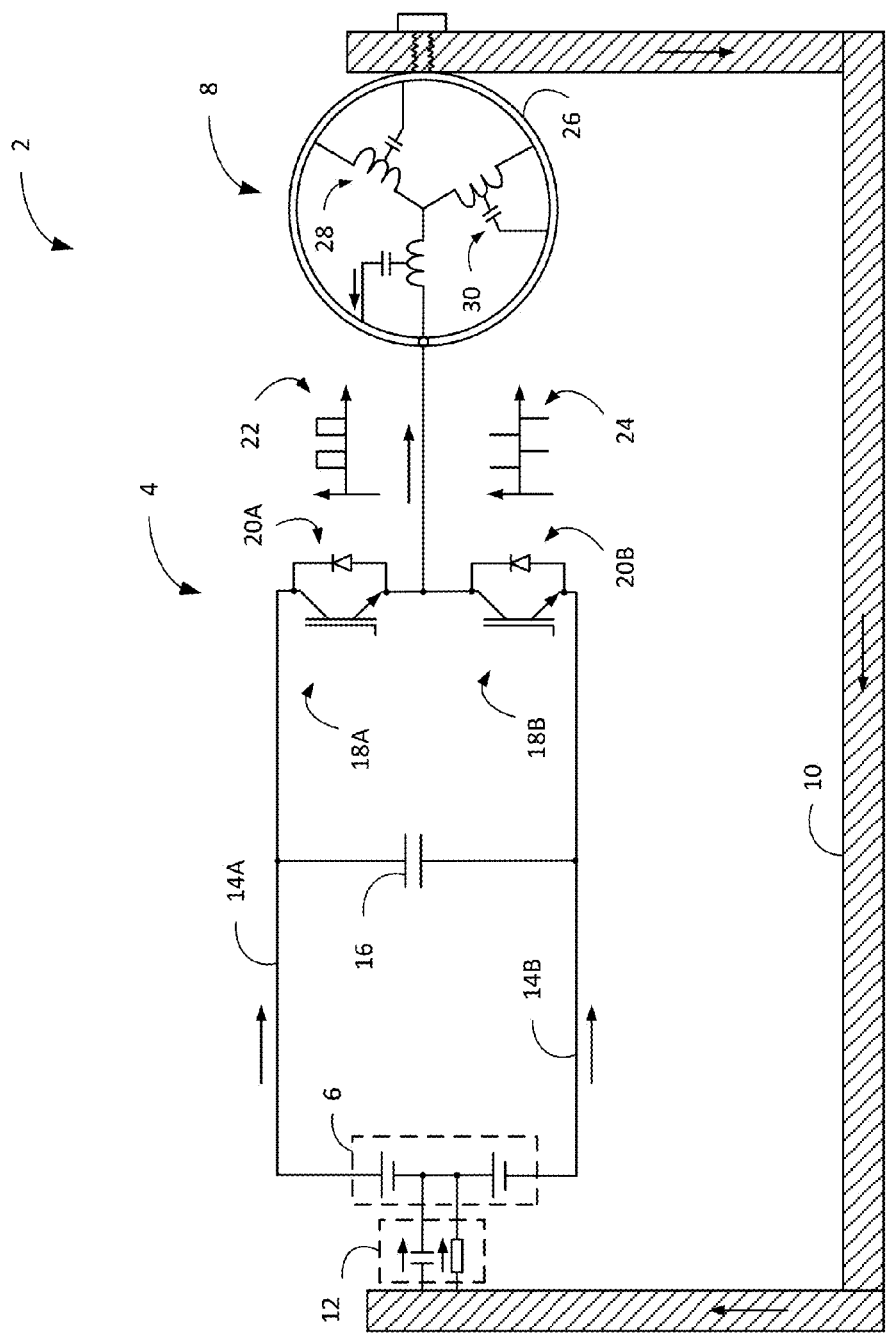
FIG. 1A is a circuit diagram of an electric circuit with a voltage source, a load, and a reference ground in accordance with some examples of this disclosure.

Electric motor drives and other loads may be controlled by a converter circuit that uses a switched mode principle to create multiple output signals. Examples of converter circuits include circuits that use a switched-mode principle, such as DC-to-AC converters, AC-to-DC converters, DC-to-DC converters, and AC-to-AC converters. In some examples, a DC-to-AC converter may switch each motor phase alternately between the DC input voltage potentials. The electronic switch can be a transistor, including but not limited to an IGBT or a MOSFET, a diode, or any other proper device. In order to achieve a high efficiency factor, the switching process may be in the range of nanoseconds. Due to this high switching speed, a high dv/dt is applied via the motor lines to the motor coil windings. Depending on the construction of the electric motor drive, the motor windings may have significant parasitic capacities that may cause a capacitive coupling to the motor housing and to the motor shaft. During each switching transition, these capacitances will be unloaded and/or reloaded, causing a high-frequency disturbance and/or a bearing current in the electric motor drive. These currents flow via the motor housing, which may be directly galvanic with high or low impedance or indirectly capacitive connected, or via the motor shaft and bearing to the reference ground.

In the example of electrical cars and hybrid-electrical cars, the reference ground is often the vehicle chassis. The parasitic disturbance currents, also known as common mode signals, return via direct high or low impedance or indirect parasitic connections and via the supply lines back to the power source. Limits and requirements for conducted and radiated emission may impact the countermeasures for preventing disturbances via parasitic capacitances. These countermeasures may ensure the resilience of the bearings.

In general, a common mode signal can be detected on the supply lines and motor (load) lines. The common mode signal flows via reference ground. For electrical motor drive applications in electrical cars and hybrid-electrical cars, the common mode signal may be present in the frequency range from the frequency of DC-to-AC converter pulse-width modulation (PWM) up to several hundred megahertz. The amount of counter-measure effort increases as the length of the motor lines connecting the DC-to-AC converter and electric motor increases.

In some examples, methods of preventing or suppressing common mode signals include partial or complete shielding of an electrical or hybrid-electrical drive train. Alternatively, a common mode filter may be used to reduce the disturbance current and the amount of shielding. To reduce bearing current, sliding contacts or insulation of bearing and clutch may be used.

Parasitic capacitances may exist within electric systems for automobiles and within electric motors inside automobiles, but this disclosure is not limited to automotive applications. Parasitic capacitances and common mode signals may exist in any other application that uses a switched-mode principle and a load that carries a common mode signal. The common mode signals flowing across parasitic capacitances and parasitic impedances may disrupt radio service reception and may cause bearing erosion. Methods for preventing and eliminating common mode signals include filters and partial or complete shielding. These solutions may be cost intensive, may consume valuable space, and may add weight to the system. Common mode filters may have to be designed for the maximum current of the application, requiring extra space and adding more weight. Furthermore, the impedance of shielding and sliding contacts may decrease over the lifetime of the system.

This disclosure describes techniques that can actively cancel a common mode signal by generating a cancellation signal that is an inverted form of the common mode signal. The common mode signal may exist as part of a first, primary signal that is intended to be applied to a load, such as an electric motor drive. The cancellation signal cancels the common mode signal when the two signals are added together. The signals are added together by applying the cancellation signal to the same load as the common mode signal. Adding the cancellation signal to the common mode signal may result in the desired signal to drive the load.

The cancellation circuit that generates the cancellation signal may include switches and one or more cancellation capacitor. By reducing the common mode signal that travels through the load, the cancellation circuit may reduce or eliminate the need for common mode filters or shielding.

In general, this disclosure describes techniques implemented by a cancellation circuit configured to generate a first, primary signal using an input signal. The cancellation circuit may include active or passive components such as switches, transistors, diodes, resistors, capacitors, and/or inductors. In some examples, the switches in the cancellation circuit may be insulated-gate bipolar transistors with freewheeling diodes, to prevent reverse breakdown of the transistor.

The primary signal may contain a common mode signal and a load signal. In some examples, the common mode signal may represent the common mode between multiple phases of the primary signal. The load signal may represent the remaining signal and may also be known as a differential signal. The primary signal may include one or more phases, which may be separate signals carried together by a wire harness.

The cancellation circuit may be further configured to generate a second, cancellation signal using the input signal. The cancellation signal may include an inverted version of the common mode signal of the primary signal. In some examples, if the common mode signal of the primary signal is a square wave, the cancellation signal may also be a square wave with identical frequency and amplitude but opposite polarity.

The cancellation circuit may be configured to apply the primary signal and the cancellation signal to a load. The load may be an electric motor of an electric or hybrid-electric automobile, in some examples. The load may also be an inductor in a heating application or a transformer. The techniques of this disclosure may apply to the load in any switched-mode circuit that uses active common mode cancellation. By applying the primary signal and the cancellation signal to the load, the cancellation signal may cancel the common mode signal, allowing the primary signal to drive the load without any effect caused by parasitic capacitances or parasitic inductances.

FIG. 1A is a circuit diagram of electric circuit 4 with voltage source 6, load 8, and reference ground 10 in accordance with some examples of this disclosure. FIG. 1A depicts the generation of a common mode current on system 2, which is a simplified schematic of a motor drive application. In system 2, voltage source 6 may be connected to electric circuit 4 via wires 14A and 14B. In some examples, wire 14A may carry positive DC voltage and wire 14B may carry negative DC voltage. Voltage source 6 may not be connected directly to reference ground 10, but a common mode current may travel from reference ground 10 to voltage source 6 through reference ground connection 12 which may be a low impedance ground bond wire or a high impedance ground bond via a resistance and/or parasitic capacitor. Reference ground connection 12 may connect to the middle potential of voltage source 6 to reference ground 10. The possible path of a common mode current is illustrated in FIG. 1A by arrows.

Wires 14A and 14B may be connected to DC-link capacitor 16. One purpose of DC-link capacitor 16 may be to prevent transient signals from radiating back from switches 18A and 18B to voltage source 6. Wires 14A and 14B may be further connected to switches 18A and 18B. In some examples, there may be more than two switches if the signal to be applied to load 8 is a multi-phase signal. There may be six switches 18A-18F if load 8 is a three-phase motor, for example. In some examples, each phase may require two switches 18 to produce or receive an alternating current.

In some examples, switches 18 may be field effect transistors with a gate, drain, and source. Switches 18 may be bipolar junction transistors or insulated gate bipolar transistors (IGBT) with a gate, emitter, and collector. IGBTs may provide benefits such as the ability to operate under high voltages, high temperatures, and high output power. Switches 18 may be any other device that is able to operate with fast transition in the nanosecond range, such as a diode or transistor. To achieve a high switching speed in the range of nanoseconds, an output voltage signal 22 is used for switches 18 and applied via the motor lines to the motor coil windings 28. Switches 18A and 18B may be connected in parallel with freewheeling diodes 20A and 20B. Freewheeling diodes 20A and 20B may prevent switches 18A and 18B from breaking down under high reverse voltages.

Electric circuit 4 may control the on and off time of switches 18A and 18B by toggling the gate voltage of each switch. There may be a delay between turning off switch 18A and turning on switch 18B. Switches 18 may be configured to switch between a plurality of states, such as on and off. Each of the states may be determined based on a clock signal that triggered the switching between states. Electric circuit 4 may be referred to as converter circuit that uses a switched mode principal, such as a DC-to-AC converter, an AC-to-DC converter, a DC-to-DC converter, or an AC-to-AC converter.

Electric circuit 4 may produce output voltage signal 22 to apply to load 8. The graph of output voltage signal 22 shows a square wave that may toggle between a first input that is associated with wire 14A and a second input that is associated with wire 14B. For output voltage signal 22, the voltage may begin at a constant level then increase at a rate depending on the transition rate of the switches, plateau at a constant level, then decrease at a rate depending on the transition rate of switches 18. The graph of output voltage signal 22 may represent only one of several phases that are applied to load 8, which may operate on a switched-mode principle. In some examples, the load 8 may be a three-phase electric motor.

Electric circuit 4 may also generate common mode current 24. The graph of common mode current 24 shows current peaks in either the positive or negative direction. The current peaks may result from switches 18A and 18B turning on or off. The timing of the pulses on the graph of common mode current 24 may depend on whether there is natural commutation or forced commutation in electric circuit 4. By applying a signal with the graph of output voltage signal 22 to the windings 28, the output voltage signal 22 may result in common mode current 24 due to parasitic capacitances throughout system 2.

Electric circuit 4 may apply the primary signal to load 8. Load 8 may include housing 26, motor coil windings 28, and parasitic capacitances 30. Parasitic capacitances 30 may not be actual capacitors but instead the capacitances that exist between components of system 2, such as housing 26 and motor coil windings 28. The common mode signal, as depicted by arrows, may flow into load 8, through parasitic capacitances 30, and through reference ground 10, which may be the chassis of an automobile in some examples. The common mode signal may then flow through reference ground 10 to voltage source 6, where the common mode signal may enter wires 14. The common mode signal may reach voltage source 6 from reference ground 10 via reference ground connection 12.

Figure 1B:
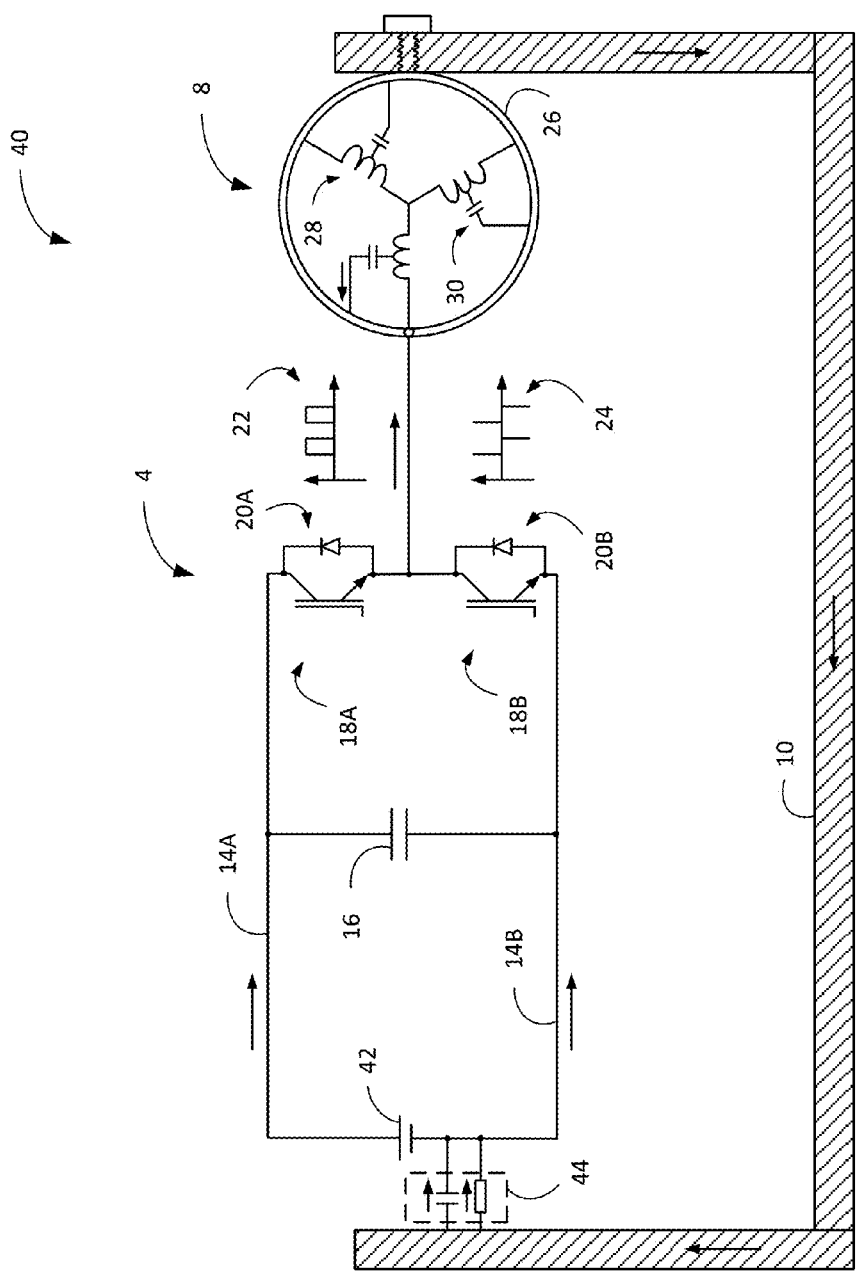
FIG. 1B is a circuit diagram of an electric circuit with a voltage source, a load, and a reference ground in accordance with some examples of this disclosure.

FIG. 1B is a circuit diagram of an electric circuit with a voltage source 42, a load 8, and a reference ground 10. System 40 contains reference ground connection 44 between reference ground 10 and the voltage source 42 and/or wires 14 in accordance with some examples of this disclosure. FIG. 1B depicts reference ground connection 44 as including a low impedance ground bond wire or a high impedance ground bond via a resistance and/or a parasitic capacitance. In some examples, parasitic capacitances and reference ground connections may exist elsewhere and in different combinations within system 40. FIG. 1B is identical to FIG. 1A except for the configuration of voltage source 42 and reference ground connection 44.

Figure 2:
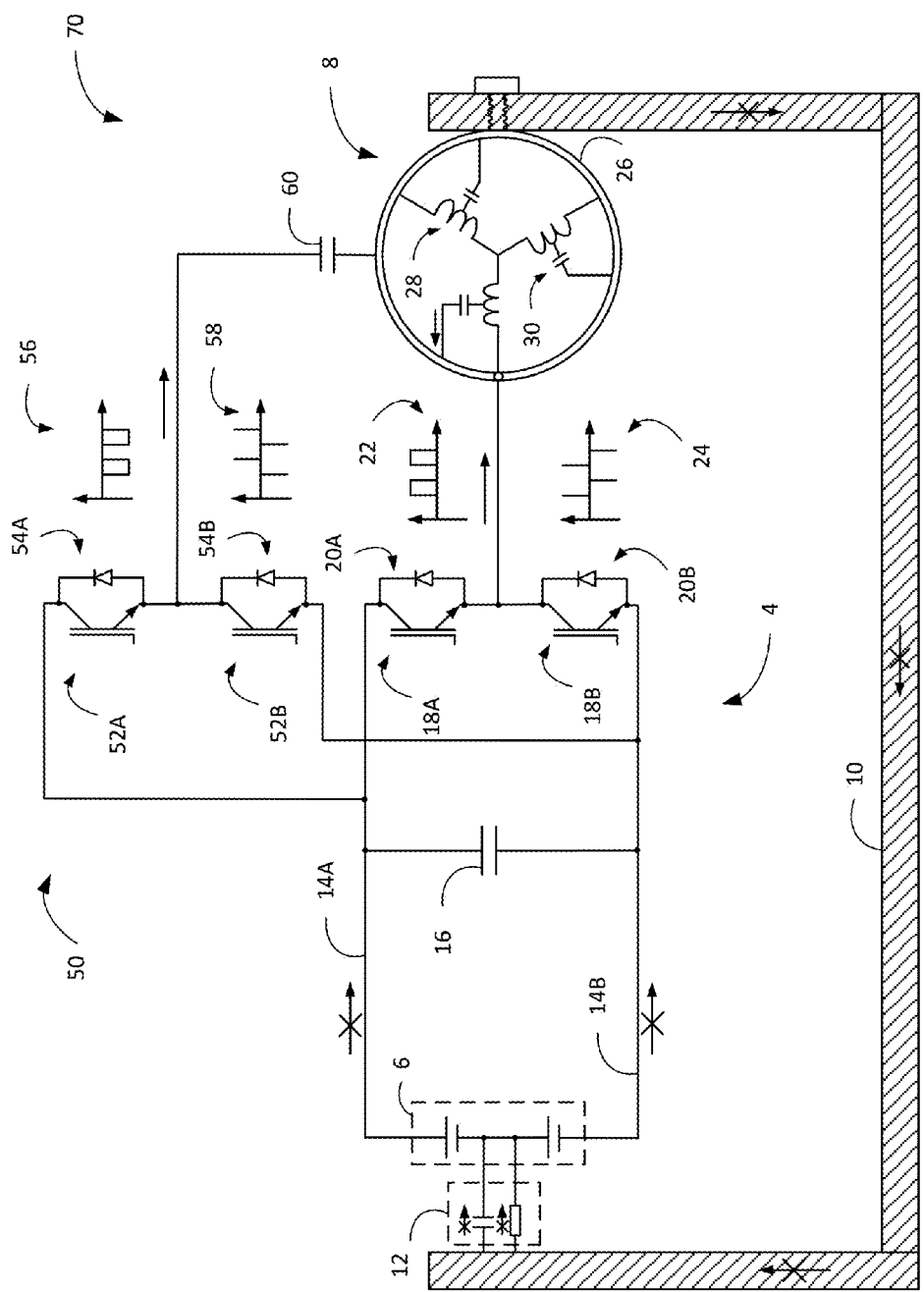
FIG. 2 is a circuit diagram of an electric circuit including a cancellation circuit in accordance with some examples of this disclosure.

FIG. 2 is a circuit diagram of an electric circuit including a cancellation circuit in accordance with some examples of this disclosure. System 70 is similar to system 2 of FIG. 1A, except the addition of cancellation circuit 50 and the cancellation of the common mode signal, as indicated by the X's across the arrows throughout system 70. Cancellation circuit 50 may also be referred to as a cancellation bridge leg.

This disclosure describes techniques to cancel a common mode signal by adding cancellation currents into motor housing 26 and/or bearing shield. These cancellation currents may be synchronized, inverted versions of the signal produced by electric circuit 4. Therefore, an inverted output voltage signal 56 synchronized to the original output voltage signal 22 of electric circuit 4 may be coupled via cancellation capacitor 60 to motor housing 26 and/or bearing shield in order to cancel the parasitic capacitance 30 from the windings 28 and avoid common mode current. Cancellation capacitor 60 may be dimensioned in relation to the characteristics of load 8 so that the amplitude of cancellation signal and the amplitude of the primary signal are equal. If a disturbance current flows via the motor shaft to the motor load, a further capacitor related to the motor load (not shown in FIG. 2) may be added. The advantage may be a reduced disturbance current on the motor housing 28 and bearings (not shown in FIG. 2), which allows reducing the amount of filtering and shielding in system 70. The principles of system 70 may apply to motor drives or any other pulse width modulation (PWM) controlled system having a common mode capacity to reference ground 10.

A variety of different types of motor drives may be used to drive an electric motor consistent with the techniques described in this disclosure, including switched-mode circuits. Inverter-controlled motor drives have at least one inverter phase for, e.g., simple DC motor drives with one rotation direction, two phases for bidirectional DC or AC motor drives, and three phase inverters for DC or AC motor drives. The phrase "inverted-controlled" may refer to electric circuit 4, which may convert a DC input signal to an AC signal for use in load 8. The number of phases is in theory not limited, and may be increased to N phases.

For each active switching motor inverter phase of electric circuit 4, cancellation circuit 50 may have one simultaneous switching phase. Depending on the control scheme with simultaneous switching motor inverter phases, the same number of phases, or fewer phases in some examples, may exist in cancellation circuit 50. In some examples, cancellation circuit 50 may produce a cancellation signal with fewer phases than the signal sent from electric circuit 4 to load 8. In some examples, cancellation circuit 50 may use the same number of phases as electric circuit 4. Cancellation circuit 50 may have the same type of switches 52 (e.g. IGBTs, MOSFETs, etc.) as electric circuit 4 in order to ensure easily a proper matching of the transition characteristic of the switches 18, but also other types of switches might be possible. The cancellation switches 52 may have a smaller current handling capability because switches 52 may only provide the cancellation current for reloading cancellation capacitor 60 during the switching transition phase of the motor inverter. The cancellation signal may be much smaller than the signal from electric circuit 4. The words "current" and "signal," as used in this disclosure, may mean the same thing, or a current may be one example of a signal.

The cancellation capacitor 60 may comprise one or more discrete capacitors or surface capacitors in or at load 8. The synchronization of the switching may be accomplished by a control unit (not shown in FIG. 2) by deriving one or more driver signals for switches 52 from one or more driver signals for switches 18. The synchronization of the switching may also be accomplished by direct synchronization of the driver signals in the control unit.

System 70 includes cancellation circuit 50 with components that may be similar to electric circuit 4, such as switches 52, freewheeling diodes 54, output voltage signal 56, and common mode current 58. Cancellation circuit 50 may receive an input signal from wires 14 and may convert the input signal to an inverted version of the output signal from electric circuit 4. The graphs of output voltage signal 56 and common mode current 58 may represent the characteristics of the cancellation signal. Output voltage signal 56 and common mode current 58 are depicted as synchronized, inverted versions of output voltage signal 22 and common mode current 24. In particular, the amplitude of output voltage signal 56 may be equal to the amplitude of output voltage signal 22, but the amplitude may be negative. When output voltage signal 22 is positive, output voltage signal 56 may be negative, so that when the signals are applied to load 8, the signals cancel the common mode current.

The cancellation signal may travel to load 8 via cancellation capacitor 60, which may be designed to cancel parasitic capacitances 30. Cancellation circuit 50 may thus apply a cancellation signal to housing 26 or another location on load 8 via cancellation capacitor 60. The cancellation signal suppresses the common mode signal because the cancellation signal is an inverted version of the common mode signal. Adding the two signals together results in a signal with zero amplitude.

Figure 3:
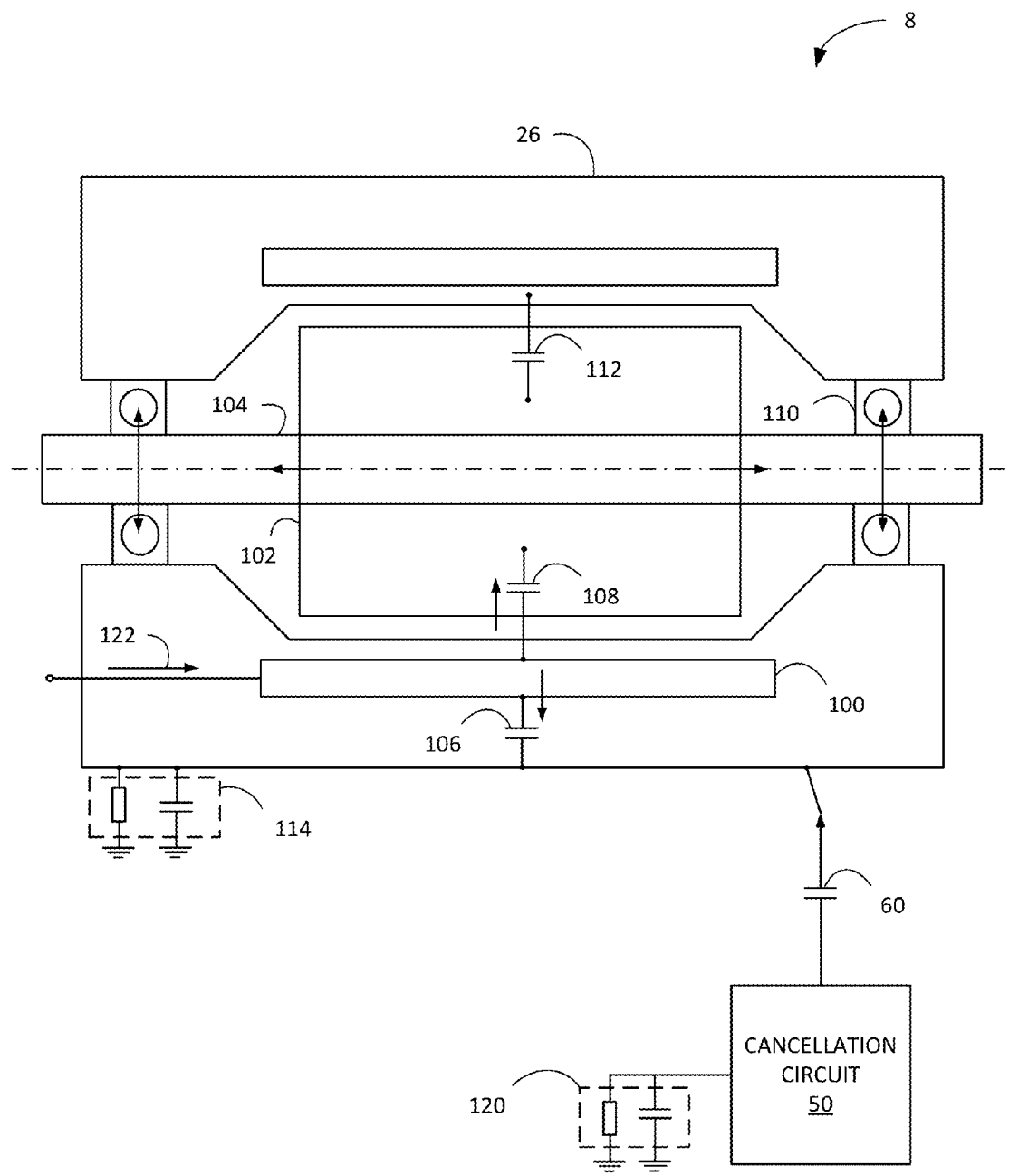
FIG. 3 is a conceptual block diagram of an electric motor with a first signal and a second signal in accordance with some examples of this disclosure.

FIG. 3 is a conceptual block diagram of an electric motor with a first, primary signal and a second signal in accordance with some examples of this disclosure. The electric motor or load 8 may include housing 26, winding 100, rotor 102, shaft 104, and bearings 110. There may be parasitic capacitances through load 8, such as winding-chassis parasitic capacitance 106, winding-rotor parasitic capacitance 108, rotor-chassis parasitic capacitances 112, and load-reference ground connection 114. The flow of primary signal 122 from the converter circuit, i.e., electric circuit 4, may be depicted by the arrows in FIG. 3. Primary signal 122 may enter through winding 100 and then travel through parasitic capacitances 106 and 108 to rotor 102 and housing 26. Primary signal 122, which may include a common mode signal, may travel through shaft 104 to bearings 110. Cancellation capacitor 60 may reduce the common mode signal throughout load 8, including in bearings 110, by providing a cancellation signal from cancellation circuit 50. Cancellation circuit 50 may be connected to the reference ground by reference ground connection 120.

Primary signal 122 enters load 8 through winding 100 and may cause a common mode signal due to the winding capacitance between winding 100 and a chassis. This is represented by parasitic capacitance 106. Primary signal 122 may also cause a common mode signal due to a coupling capacitance between winding 100 and rotor 102. This is represented by parasitic capacitance 108. The common mode signal flowing rotor 102 may travel through shaft 104 and bearings 110.

Figure 4:
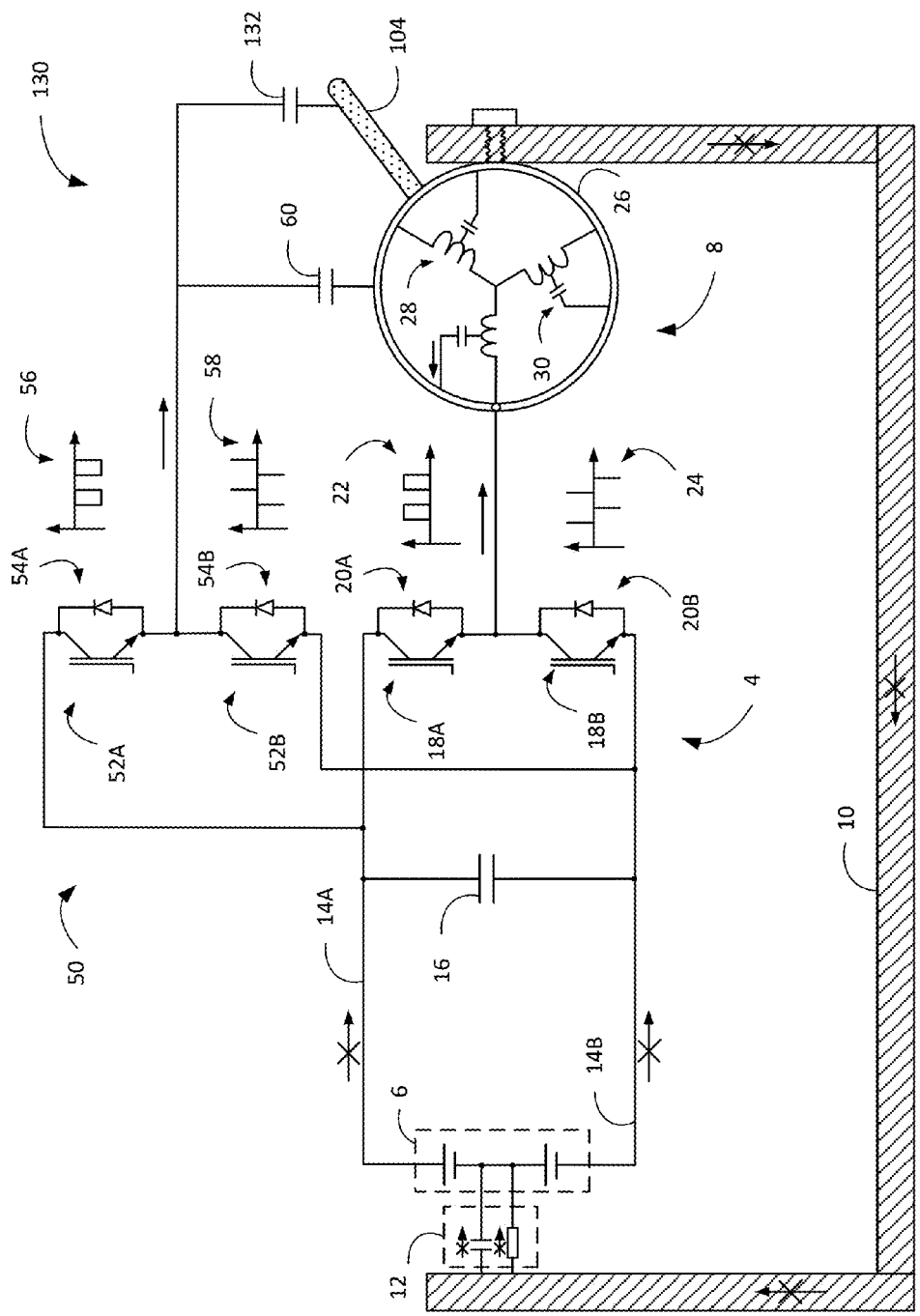
FIG. 4 is a circuit diagram of an electric circuit including a cancellation circuit that is connected to two components of a load in accordance with some examples of this disclosure.

FIG. 4 is a circuit diagram of an electric circuit including a cancellation circuit that is connected to two components of a load in accordance with some examples of this disclosure. System 130 may be similar to system 70 depicted in FIG. 2 with the addition of cancellation capacitor 132 and shaft 104. In system 130, cancellation circuit 50 may apply a cancellation signal to load 8 via cancellation capacitors 60 and 132. Cancellation circuit 50 may apply a cancellation signal to shaft 104 via cancellation capacitor 132.

Load 8 may be a motor, an inductor, a transformer, or an inverter. In some examples, if load 8 is a three-phase AC-motor, electric circuit 4 may consist of three half-bridge legs connected by three AC-lines to load 8. For active common mode cancellation, one or more additional bridge legs may generate the cancellation output voltage signal 56. The cancellation signals may be synchronized to the original output voltage signal 22. The synchronization control circuit (not shown in FIG. 4) may consider the motor line current directions.

Figure 5:
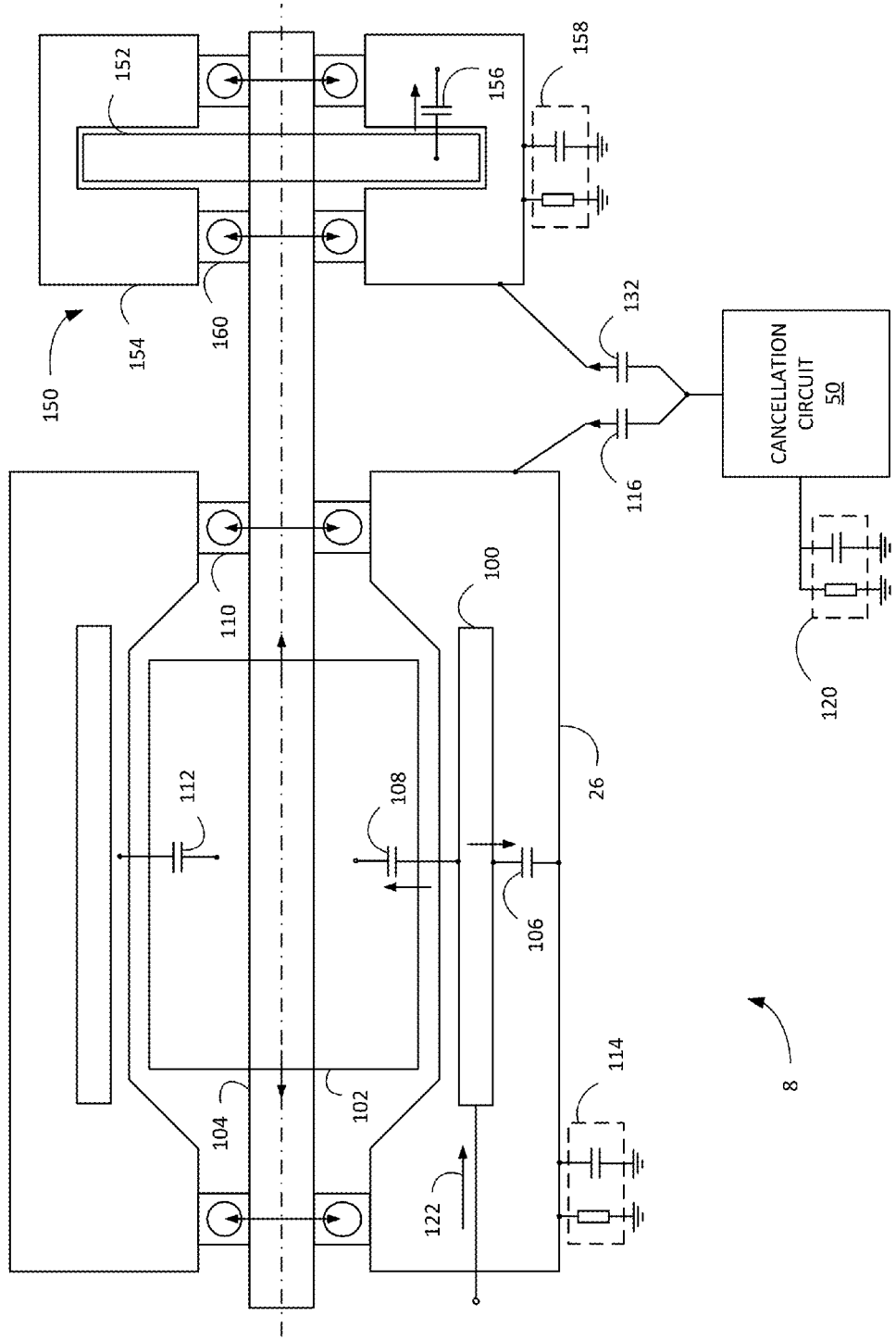
FIG. 5 is a conceptual block diagram of an electric motor with a shaft and a separate load connected to the shaft in accordance with some examples of this disclosure.

FIG. 5 is a conceptual block diagram of an electric motor with a shaft and a separate load connected to the shaft in accordance with some examples of this disclosure. For load 8 connected to shaft 104, there may be additional common mode signals through bearings 110 and 160. To cancel the common mode signals travelling through second load 150, cancellation circuit 50 may deliver a cancellation signal to housing 154 of second load 150.

A common mode signal may reach second load 150 via shaft 104 and bearings 160. Second load 150 may be connected to shaft 104 via rotor 152. There may be parasitic capacitances such as rotor-housing parasitic capacitance 156 and load-reference ground connection 158. Second load 150, which may be mounted to shaft 104, may be affected by common mode bearing currents as long as second load 150 is electrically grounded or as long as second load 150 has a coupling capacity towards the electrical environment, i.e., reference ground or another component in system 130. The common mode bearing current may flow via a ground connection or coupling capacitor towards reference ground. The common mode bearing current in second load may be reduced by an additional cancellation capacitor 132 connected to the existing cancellation circuit 50.

Figure 6:
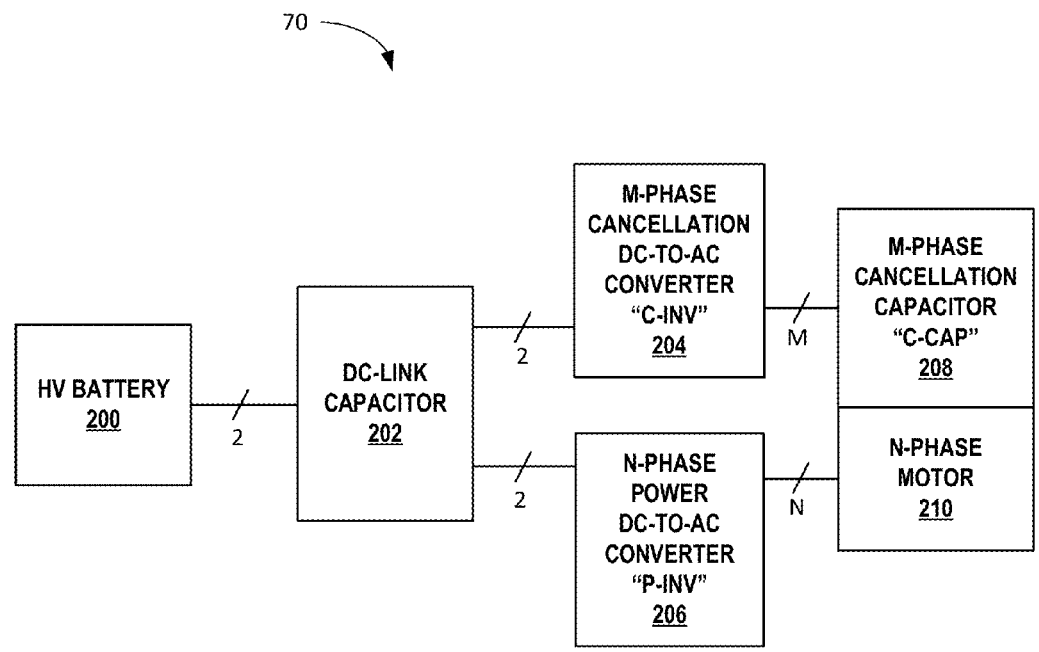
FIG. 6 is a conceptual block diagram of an electric circuit in accordance with some examples of this disclosure.

FIG. 6 is a conceptual block diagram of an electric circuit in accordance with some examples of this disclosure. As depicted in FIG. 6, system 70 is a DC-to-AC converter, but the techniques of this disclosure may apply to other converter circuits. As a DC-to-AC converter, system 70 may include high voltage (HV) battery 200 that may be connected to the DC-link capacitor 202. The connection from DC-link capacitor 202 to HV battery 200, M-phase cancellation DC-to-AC converter 204, and N-phase power DC-to-AC converter 206 may be two-stage wires. M-phase cancellation DC-to-AC converter 204 and N-phase power DC-to-AC converter 206 may also be referred to as p-inv, for power inverter, and c-inv, for cancellation-inverter. M-phase cancellation DC-to-AC converter 204 may be connected with M lines to M-phase cancellation capacitors 208, also known as c-cap. M-phase cancellation capacitors 208 may be connected to the motor housing of N-phase motor 210. N-phase motor 210 may be connected to N-phase power DC-to-AC converter 206 with N lines. In system 70, N may be greater than or equal to M because M-phase cancellation DC-to-AC converter 204 may generate a cancellation signal with fewer phases than N-phase motor 210. The power rating for M-phase cancellation DC-to-AC converter 204 may be much lower compared to N-phase power DC-to-AC converter 206 because charging and discharging M-phase cancellation capacitors 208 may not require a large signal.

Figure 7A:
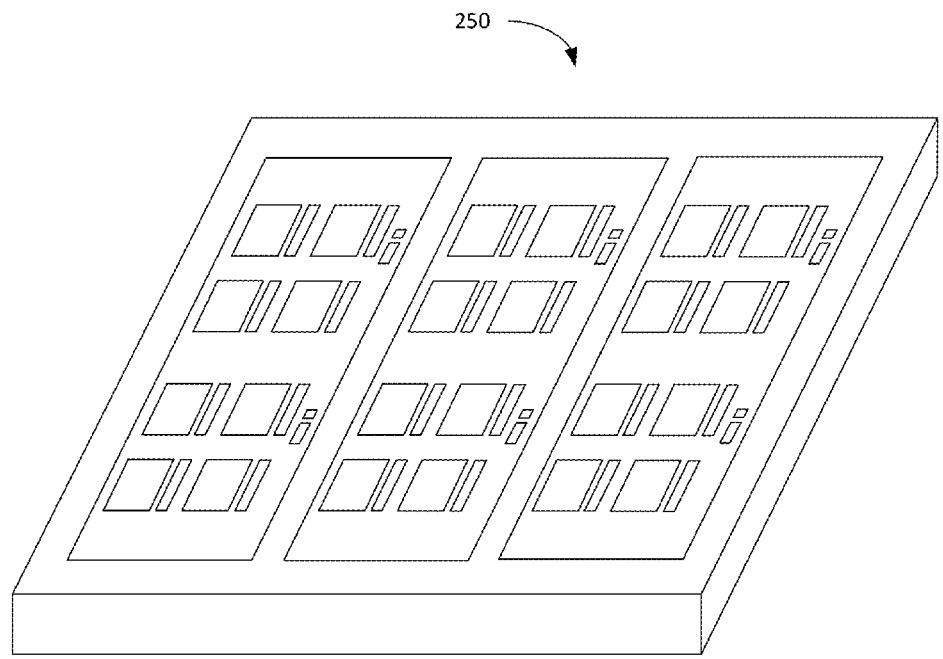
FIG. 7A is an illustration of an integrated circuit containing a converter circuit and a cancellation circuit in accordance with some examples of this disclosure.
Figure 7B:
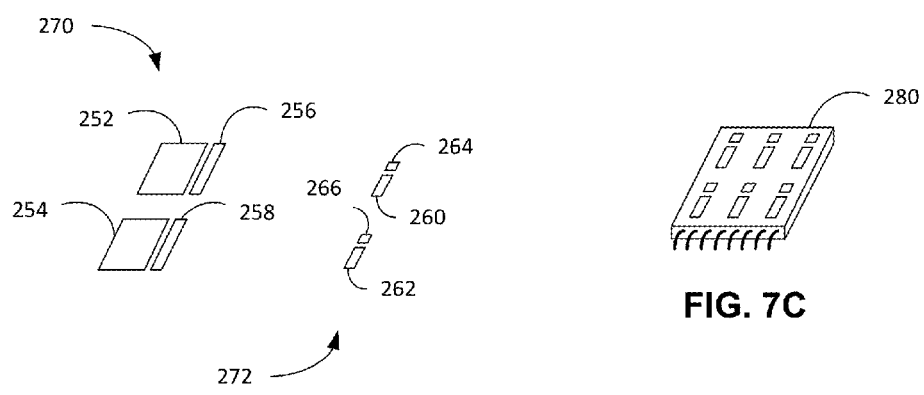
FIG. 7B is an illustration of individual components of a converter circuit and a cancellation circuit in accordance with some examples of this disclosure.
Figure 7C:
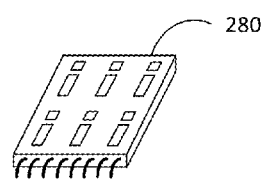
FIG. 7C is an illustration of an integrated circuit containing a cancellation circuit in accordance with some examples of this disclosure.

FIG. 7A is an illustration of a chip set containing an inverter circuit and a cancellation circuit in accordance with some examples of this disclosure. FIG. 7B is an illustration of individual components of an inverter circuit and a cancellation circuit in accordance with some examples of this disclosure. FIG. 7C is an illustration of an integrated circuit containing a cancellation circuit in accordance with some examples of this disclosure. In FIG. 7B, inverter circuit 270 may include switches 252 and 254, alongside freewheeling diodes 256 and 258. Cancellation circuit 272 may include switches 260 and 262, alongside freewheeling diodes 264 and 266.

The cancellation circuit 272 may only charge and discharge the cancellation capacitors. As a result, its chip size may be much smaller, as compared to the chip size of inverter circuit 270. Therefore, different implementation options may be possible for inverter circuit 270 and cancellation circuit 272. In configuration 250, inverter circuit 270 and cancellation circuit 272 may be combined or integrated into one package. In configuration 280, a standalone chip set may include only cancellation circuit 272 assembled in a separate package. Configuration 280 may be added to DC-to-AC converter circuit 270 as part of a refurbishment or through some other process.

Figure 8:
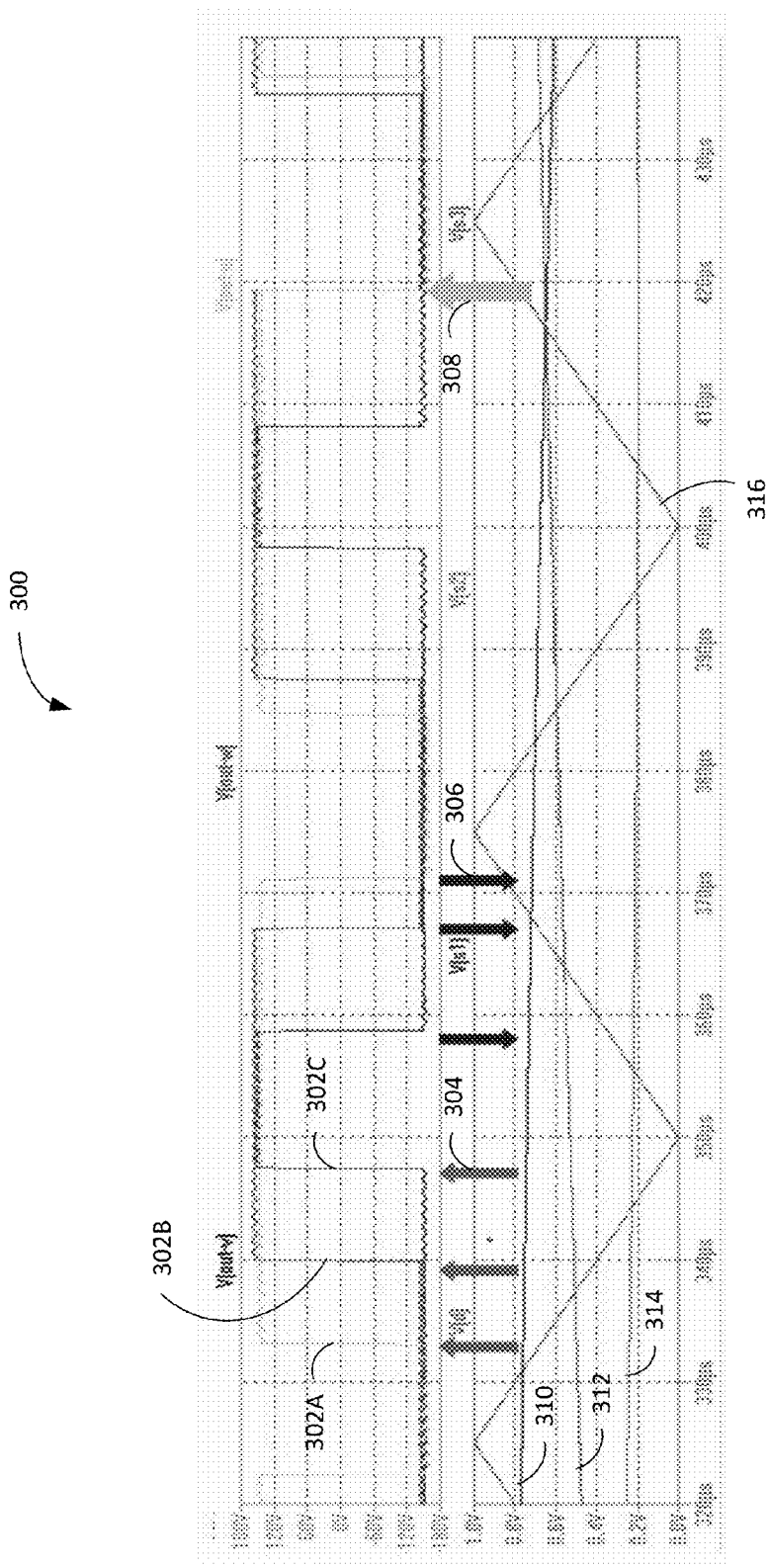
FIG. 8 is a graph of simulation results for three-phase cancellation in accordance with some examples of this disclosure.

FIG. 8 is a graph of simulation results for three-phase cancellation in accordance with some examples of this disclosure. Graph 300 may show a three-phase sinusoidal-triangle modulation. Signals 302A-302C may represent the output phase voltages OUT-U, Out-V, OUT-W for a three phase DC-to-AC converter circuit. Lines 310, 312, and 314, along with triangle wave 316, may show a pulse pattern generated for sinusoidal-triangle modulation. Lines 310, 312, and 314 may be sinusoidal waves, and each sine wave may be a phase that drives an electric motor. Upward arrows 304 may denote a positive dv/dt for signals 302A-302C, and downward arrows 306 may denote a negative dv/dt for signals 302A-302C. Arrow 308 may denote instantaneously switching of more than one phase for signals 302A-302C.

In some examples, signals 302 may represent the output voltages for a three-phase DC-to-AC converter circuit. One purpose of a three phase DC-to-AC converter may be to generate sinusoidal motor currents. For each positive dv/dt of the DC-to-AC converter, the cancellation circuit may generate a negative dv/dt. Once an output voltage signal charges the cancellation capacitors, the cancellation circuit may need to actively discharge the cancellation capacitors. For the N-phase sinusoidal-triangle-modulation, a sequence of up to N positive output voltage signals may occur. Therefore, M=N independent cancellation capacitors may be used, and the cancellation circuit may have the same phase number as the DC-to-AC converter. By applying other modulation strategies the phase number for the cancellation circuit may differ from the DC-to-AC converter phase number. In some examples, the pulse pattern for space vector modulated 3-phase DC-to-AC converter may be optimized in a way that the cancellation circuit needs only 2-phases. In this way, the number of phases in the cancellation signal may be less than or equal to the number of phases in the first, primary signal generated to drive the load.

FIG. 9A includes graphs illustrating forced commutation versus natural commutation for two switches in accordance with some examples of this disclosure. FIG. 9B is a circuit diagram illustrating forced commutation versus natural commutation for two switches in accordance with some examples of this disclosure. Active common mode cancellation may be effective if the cancellation dv/dt signal occurs at the same time as the original dv/dt from the DC-to-AC converter. Therefore, the cancellation output voltage signal may be synchronized to the original output voltage signal from the DC-to-AC converter. If there is a dead time between switching from high-side to low-side or vice versa, as shown in graphs 350, 352, 364, and 366, then there may be a difference between natural and forced commutation. Commutation is the process when the load current changes from the off-going switch to the on-going switch. For forced commutation, the current may change when the off-going switch turns off. For natural commutation, the current may change when the on-going switch turns on. The output voltage signal may be linked to the current commutation. Forced and natural commutation may be dependent on the current-direction in the attached motor line.

Graphs 350 and 352 are similar to graphs 364 and 366 and represent the driving signals for switches 52. The driving signals may be based on a clock signal. The horizontal axis represents time, such that T4 shuts off before T1 turns on. At the beginning of the time scale, switch 52B may be on. Graphs 354 show line current 384 at a negative value. While T4 is on in graph 352, Line current graph 354 flows through switch 52B as line current 386 and switch current 388. Graphs 356 and 358 show that, at the beginning of the time period, current is flowing through switch 52B but not switch 52A. Graphs 360 and 362 may represent the voltage across switches 52A and 52B, respectively.

When T4 shuts off in graph 352, both switches 52 may be off. Switch current 388 may shut off, and line current 384 may flow as negative line current 380 through freewheeling diode 54A. When T1 turns on in graph 350, switch 52A may remain off because of a negative voltage differential, but diode 54A may continue to conduct Switch current 382 may remain at or near zero throughout this process. This transition from switch 52B to diode 54A is called forced commutation.

Graphs 364-376 may illustrate an example of natural commutation. In natural commutation, line current 384 may remain at a positive value throughout the time period, as shown in graph 368. Line current graph 368 may flow as negative line current 386 through diode 54B, while switch current 388 may remain off. Graphs 370 and 372 show that current is flowing through diode 54B but not switch 52B or diode 54A. Graphs 374 and 376 may represent the voltage across switches 52A and 52B, respectively. The positive voltage in graph 374 may not result in a flow of line current 382 until T1 turns on.

When T4 shuts off in graph 366, both switches 52 may be off. Switch current 388 may shut off, and line current 386 may continue to flow through freewheeling diode 54B. When T1 turns on in graph 364, switch 52A may turn on because of a positive voltage differential, and diode 54B may shut off. Line current 380 may flow as switch current 382 after T1 turns on. This transition from diode 54B to switch 52A is called natural commutation. For forced commutation in FIG. 9A, the dv/dt may occur during the turn off of T4. For natural commutation, the dv/dt may occur after the turn on of T1.

Figure 10:
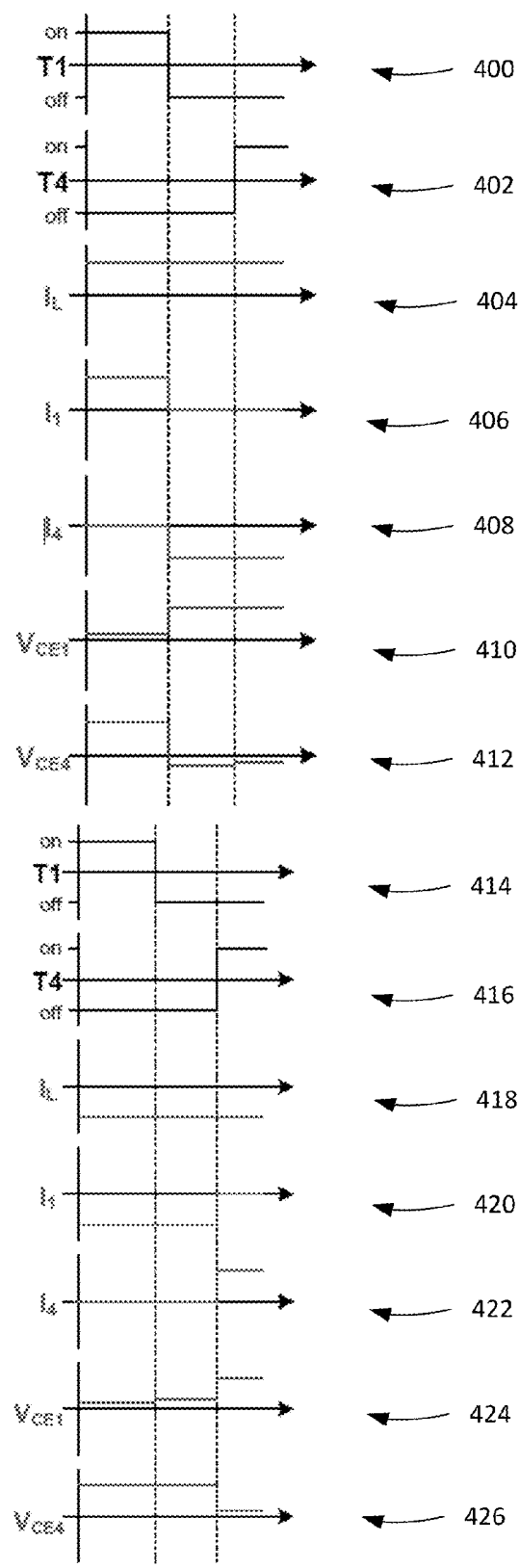
FIG. 10 includes graphs illustrating forced commutation versus natural commutation for two switches in accordance with some examples of this disclosure.

FIG. 10 includes graphs illustrating forced commutation versus natural commutation for two switches in accordance with some examples of this disclosure. Graphs 400, 402, 414, and 416 show that T1 turns off before T4 turns on. Graphs 400-412 depict forced commutation as line current 384 draws from switch 52A, and then from diode 54B. Graphs 414-426 depict natural commutation as line current 384 flow through diode 54A, and then from switch 52B.

Figure 11:
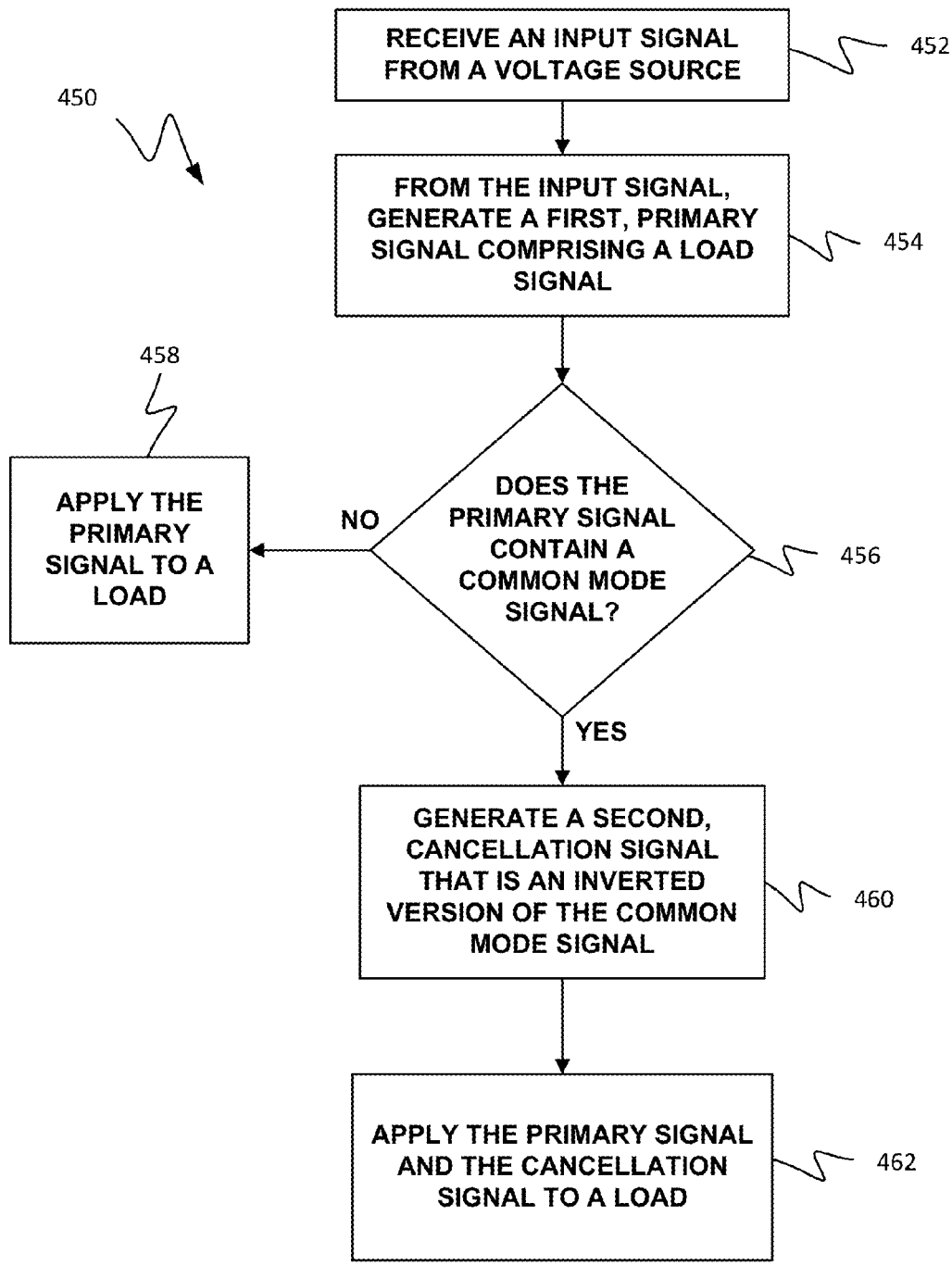
FIG. 11 is a flowchart illustrating active common mode cancellation in accordance with some examples of this disclosure.

FIG. 11 is a flowchart illustrating active common mode cancellation in accordance with some examples of this disclosure. Process 450 is described from the perspective of system 2 of FIG. 4, although other types of systems or circuits may be used to perform similar techniques. As shown in FIG. 11, electric circuit 4 receives an input signal from voltage source 6 (452). Electric circuit 4 may generate, from the input signal, a first, primary signal that comprises a load signal (454).

Depending on whether the primary signal contains a common mode signal, cancellation circuit 50 may generate a cancellation signal (456). If the primary signal does not contain a common mode signal, electric circuit 4 may apply the primary signal to load 8 (458). If the primary signal contains a common mode signal, cancellation circuit 50 may generate a second, cancellation signal that is an inverted version of the common mode signal (460). If the primary signal contains a common mode signal, electric circuit 4 may apply the primary signal to load 8, and cancellation circuit 50 may apply the cancellation signal to load 8 (462).

The following numbered examples demonstrate one or more aspects of the disclosure.

Example 1

A circuit configured to: generate a first signal based at least in part on an input signal, wherein the first signal comprises a common mode signal and a load signal; generate a second signal based at least in part on the input signal, wherein the second signal comprises an inverted version of the common mode signal; and apply the first signal and the second signal to a load.

Example 2

The circuit of example 1, wherein the circuit comprises a plurality of switches; wherein each switch of the plurality of switches is configured to switch between a plurality of states; and wherein each of the states of the plurality of switches is determined based on a clock signal.

Example 3

The circuit of any combination of examples 1-2, wherein at least one switch of the plurality of switches comprises an insulated-gate bipolar transistor.

Example 4

The circuit of any combination of examples 1-3, wherein at least one switch of the plurality of switches comprises a transistor and a diode.

Example 5

The circuit of any combination of examples 1-4, wherein the circuit is further configured to apply the second signal to the load via a cancellation capacitor.

Example 6

The circuit of any combination of examples 1-5, wherein the cancellation capacitor is configured to offset at least one parasitic capacitance of the load.

Example 7

The circuit of any combination of examples 1-6, wherein the second signal comprises a synchronized inverted version of the common mode signal.

Example 8

The circuit of any combination of examples 1-7, wherein the first signal comprises N phases; wherein the second signal comprises M phases; and wherein N is greater than or equal to M.

Example 9

The circuit of any combination of examples 1-8, wherein the load comprises an electric motor; and wherein the circuit is further configured to apply the second signal, via a cancellation capacitor, to a housing of the electric motor.

Example 10

The circuit of any combination of examples 1-9, wherein the circuit is further configured to apply the second signal to a second load connected to a shaft of the electric motor.

Example 11

A circuit configured to: generate a cancellation signal based at least in part on an input signal and a common mode signal, wherein the cancellation signal comprises an inverted version of the common mode signal; and apply the cancellation signal to a load.

Example 12

The circuit of example 11, wherein the circuit comprises a plurality of switches; wherein each switch of the plurality of switches is configured to switch between a plurality of states; and wherein the states of the plurality of switches are determined based on a clock signal.

Example 13

The circuit of any combination of examples 11-12, wherein the circuit is further configured to apply the cancellation signal to the load via a cancellation capacitor.

Example 14

The circuit of any combination of examples 11-13, wherein the load comprises an electric motor; and wherein the circuit is further configured to apply the cancellation signal to a second load connected to a shaft of the electric motor.

Example 15

A system comprising: an electric motor; a converter circuit configured to generate a first signal based at least in part on an input signal, wherein the first signal comprises a common mode signal and a load signal, wherein the converter circuit is configured to apply the first signal to the electric motor; and a cancellation circuit configured to generate a second signal based at least in part on the input signal, wherein the second signal comprises an inverted version of the common mode signal, wherein the cancellation circuit is configured to apply the second signal to the electric motor via a cancellation capacitor.

Example 16

The system of example 15, wherein the converter circuit comprises a first plurality of switches, wherein each switch of the first plurality of switches is configured to switch between a plurality of states, and wherein the states of the first plurality of switches are determined based on a clock signal; and wherein the cancellation circuit comprises a second plurality of switches, wherein each switch of the second plurality of switches is configured to switch between a plurality of states, and wherein the states of the second plurality of switches are determined based on a clock signal.

Example 17

The system of any combination of examples 15-16, wherein applying the second signal to the load comprises applying the second signal to the electric motor and applying the cancellation signal to a second load connected to a shaft of the electric motor.

Example 18

A method comprising: generating, by a first circuit, a first signal based at least in part on an input signal, wherein the first signal comprises a common mode signal and a load signal; generating, by a cancellation circuit, a second signal based at least in part on the input signal, wherein the second signal comprises an inverted version of the common mode signal; applying, by the first circuit, the first signal to a load; and applying, by the cancellation circuit, the second signal to the load.

Example 19

The method of example 18, wherein the first circuit comprises a first plurality of switches, wherein each switch of the first plurality of switches is configured to switch between a plurality of states, and wherein the states of the first plurality of switches are determined based on a clock signal; and wherein the cancellation circuit comprises a second plurality of switches, wherein each switch of the second plurality of switches is configured to switch between a plurality of states, and wherein the states of the second plurality of switches are determined based on a clock signal.

Example 20

The method of any combination of examples 18-19, wherein the load comprises an electric motor; and wherein applying the second to the load comprises applying, by the cancellation circuit, the second signal to the electric motor via a cancellation capacitor; and applying, by the cancellation circuit, the second signal to a second load connected to a shaft of the electric motor via a cancellation capacitor.

Various examples of the disclosure have been described. Any combination of the described systems, operations, or functions is contemplated. These and other examples are within the scope of the following claims.

What is claimed is:

1. A circuit comprising:
an electric circuit configured to:
generate a first signal based at least in part on an input signal, wherein the first signal comprises a common mode signal and a load signal; and
apply the first signal to a load; and
a cancellation circuit configured to:
generate a second signal based at least in part on the input signal, wherein the second signal comprises an inverted version of the common mode signal; and
apply the second signal to the load.

2. The circuit of claim 1,
wherein the circuit comprises a plurality of switches;
wherein each switch of the plurality of switches is configured to switch between a plurality of states; and
wherein each of the states of the plurality of switches is determined based on a clock signal.

3. The circuit of claim 2, wherein at least one switch of the plurality of switches comprises an insulated-gate bipolar transistor.

4. The circuit of claim 2, wherein at least one switch of the plurality of switches comprises a transistor and a diode.

5. The circuit of claim 1, wherein the cancellation circuit is configured to apply the second signal to the load via a cancellation capacitor.

6. The circuit of claim 5, wherein the cancellation capacitor is configured to offset at least one parasitic capacitance of the load.

7. The circuit of claim 1, wherein the second signal comprises a synchronized inverted version of the common mode signal.

8. The circuit of claim 1,
wherein the first signal comprises N phases;
wherein the second signal comprises M phases; and
wherein N is greater than or equal to M.

9. The circuit of claim 1,
wherein the load comprises an electric motor;
wherein the electric circuit is configured to apply the first signal to a coil winding of the electric motor; and
wherein the cancellation circuit is configured to apply the second signal, via a first cancellation capacitor, to a housing of the electric motor.

10. The circuit of claim 9,
wherein the cancellation circuit is further configured to apply the second signal, via a second cancellation capacitor, to a second load connected to a shaft of the electric motor.

11. A circuit configured to:
generate a cancellation signal based at least in part on an input signal and a common mode signal, wherein the cancellation signal comprises an inverted version of the common mode signal; and
apply the cancellation signal to a first point on a load, wherein the common mode signal is applied to a second point on the load.

12. The circuit of claim 11,
wherein the circuit comprises a plurality of switches;
wherein each switch of the plurality of switches is configured to switch between a plurality of states; and
wherein the states of the plurality of switches are determined based on a clock signal.

13. The circuit of claim 11, wherein the circuit is configured to apply the cancellation signal to the first point on the load via a cancellation capacitor.

14. The circuit of claim 11,
wherein the load comprises an electric motor;
wherein the circuit is configured to apply the cancellation signal to the first point on the load by at least applying the cancellation signal to a coil winding of the electric motor;
wherein the second point on the load comprises a housing of the electric motor; and
wherein the circuit is further configured to apply the cancellation signal to a second load connected to a shaft of the electric motor.

15. A system comprising:
an electric motor including a coil winding and a housing;
a converter circuit configured to:

generate a first signal based at least in part on an input signal, wherein the first signal comprises a common mode signal and a load signal, and apply the first signal to the coil winding of the electric motor; and a cancellation circuit configured to:

generate a second signal based at least in part on the input signal, wherein the second signal comprises an inverted version of the common mode signal, and apply the second signal to the housing of the electric motor via a cancellation capacitor.

16. The system of claim 15, wherein the converter circuit comprises a first plurality of switches, wherein each switch of the first plurality of switches is configured to switch between a plurality of states, and wherein the states of the first plurality of switches are determined based on a clock signal; and wherein the cancellation circuit comprises a second plurality of switches, wherein each switch of the second plurality of switches is configured to switch between a plurality of states, and wherein the states of the second plurality of switches are determined based on a clock signal.

17. The system of claim 15, wherein the cancellation circuit is further configured to apply the second signal to a load connected to a shaft of the electric motor.

18. A method comprising:

generating, by a first circuit, a first signal based at least in part on an input signal, wherein the first signal comprises a common mode signal and a load signal;

generating, by a cancellation circuit, a second signal based at least in part on the input signal, wherein the second signal comprises an inverted version of the common mode signal;

applying, by the first circuit, the first signal to a load; and applying, by the cancellation circuit, the second signal to the load.

19. The method of claim 18, wherein the first circuit comprises a first plurality of switches, wherein each switch of the first plurality of switches is configured to switch between a plurality of states, and wherein the states of the first plurality of switches are determined based on a clock signal; and wherein the cancellation circuit comprises a second plurality of switches, wherein each switch of the second plurality of switches is configured to switch between a plurality of states, and wherein the states of the second plurality of switches are determined based on a clock signal.

20. The method of claim 18, wherein applying the first signal to the load comprises applying the first signal to a coil winding of an electric motor; and wherein applying the second signal to the load comprises:

applying, by the cancellation circuit, the second signal to a housing of the electric motor via a first cancellation capacitor; and applying, by the cancellation circuit, the second signal to a second load connected to a shaft of the electric motor via a second cancellation capacitor.

* * * * *